United States Patent [19]

Stevens

[11] Patent Number: 4,792,179
[45] Date of Patent: Dec. 20, 1988

[54] TONNEAU COVER ATTACHING SYSTEM

[76] Inventor: Michael C. Stevens, 1717-6 Solano Way, Concord, Calif. 94520

[21] Appl. No.: 842,255

[22] Filed: Mar. 21, 1986

[51] Int. Cl.⁴ .................................................. B60J 7/10
[52] U.S. Cl. ..................................... 296/100; 160/327
[58] Field of Search ............................ 296/100; 160/327

[56] References Cited

U.S. PATENT DOCUMENTS

| | | | |
|---|---|---|---|
| 3,373,464 | 3/1968 | Ausnit | 160/327 |
| 3,765,717 | 10/1973 | Garnert | 296/100 |
| 4,036,521 | 7/1977 | Clenet | 296/100 |
| 4,061,394 | 12/1977 | Vodin | 296/100 |
| 4,639,033 | 1/1987 | Wheatley et al. | 296/100 |
| 4,647,103 | 3/1987 | Walblay | 296/100 |

Primary Examiner—Robert R. Song
Attorney, Agent, or Firm—Majestic, Gallagher, Parsons & Siebert

[57] ABSTRACT

This invention attaches a flexible truck bed cover to the truck, by means of a plastic strip sewn into the cover, fitting inside a gap at the top of the bed, created by a supporting frame or a bed liner. The stretch in the flexible cover allows the plastic strip into the gap on all four sides of the bed and the contracting of the fabric keeps it in there, plus while the vehicle is in motion, the downward motion of the slipstream increases the forces holding the strip into the gap. A zip out access panel facilitates a separate opening within the cover itself for one-handed opening and ease of access by means of a U shaped panel behind the cab of the truck. Being the full width of the bed and 25 inches down the bed, it gives 10 square feet of access.

2 Claims, 2 Drawing Sheets

U.S. Patent    Dec. 20, 1988    Sheet 1 of 2    4,792,179
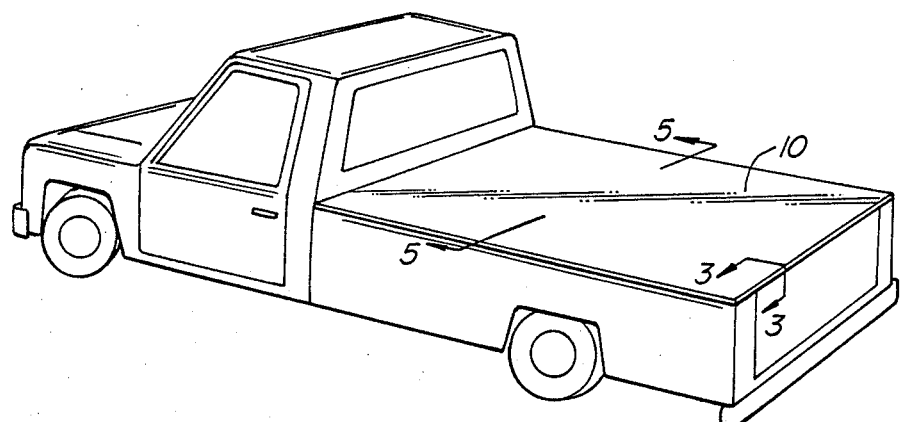
FIG._1.
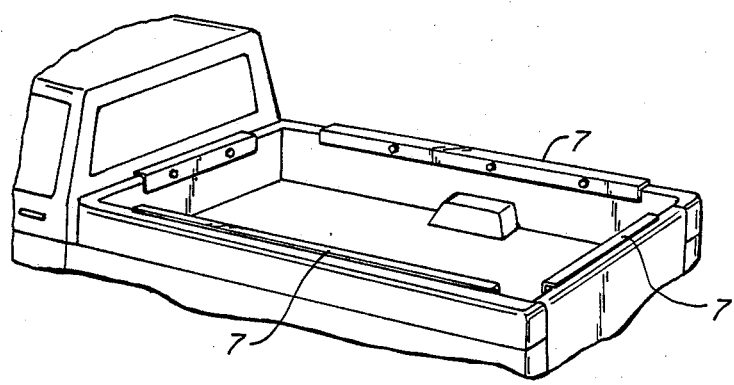
FIG._2.
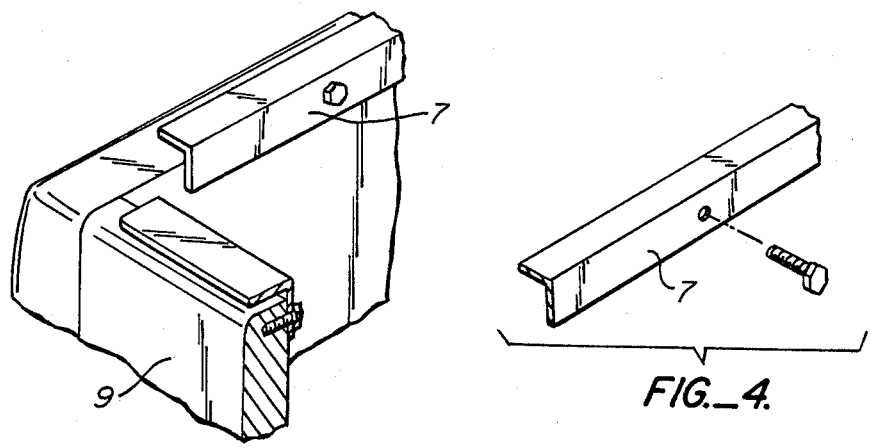
FIG._3.
FIG._4.

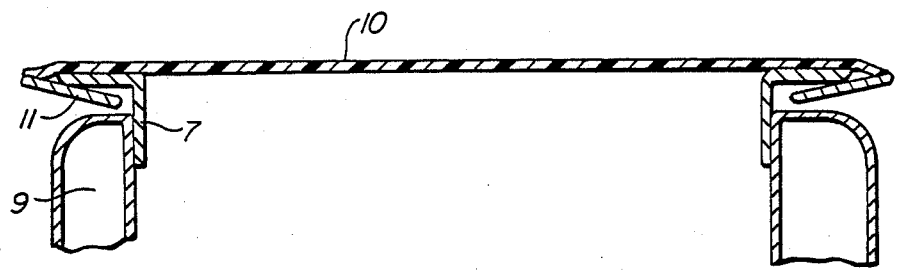
FIG._5.
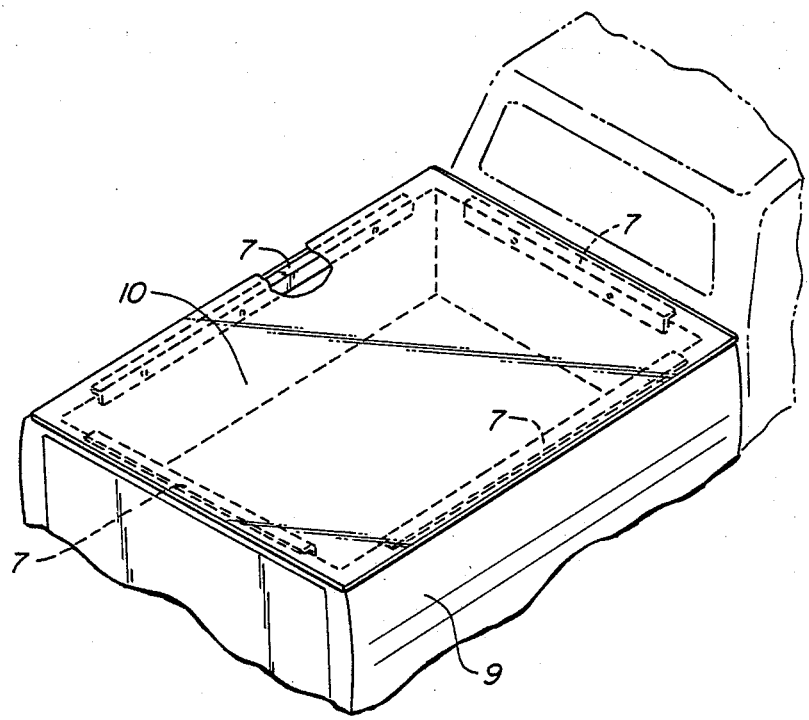
FIG._6.

TONNEAU COVER ATTACHING SYSTEM

BACKGROUND OF THE INVENTION

This invention related to a method of attaching a flexible cover to a rectangle storage space, such as a pickup truck bed or boat cockpit. This attaching method seals the flexible cover to the sides of the space to provide weatherproof storage, retain the contents within that space, and reduce the aerodynamic drag of that space, when the vehicle is travelling. By supporting the cover continuously, with a metal frame, it has greater strength to withstand the forces, of the vehicle movement, than other attaching methods. This invention fills the need for an attaching method, which does not require any holes drilled in the top or outside of the truck bed.

DESCRIPTION OF THE PRIOR ART

Present attaching systems consist of metal closing devices such as snaps or switch toggles. These need a metal part in the cover and on the vehicle, result in a rust problem and paint damage if the cover should flap against the vehicle. Also the support they offer is intermittent and not continuous like this invention. Another method is the hook and loop fastener such as "Velcro", which is stuck onto the vehicle, and was designed for clothing and does not have the strength to withstand the forces of the vehicle in motion.

SUMMARY

The invention consists of a flexible cover, made to the exact size of the storage space or truck bed, plus the width of the rails. Into the edges of this cover, is sewn a flexible plastic strip one inch wide and an eight of an inch thick. This plastic strip fits into a gap created by the L shaped rails, which are fitted to the truck bed and the truck bed itself.

As the plastic strip is slid into the gap by stretching the vinyl cover temporarily, the greater the downward pressure on the cover, the more it is held into the rails.

The rails are fitted to the inside of the truck bed and thus avoid the necessity of holes in the top or outside of the bed such as snaps or toggles. These rails act as protectors for the top edges of the bed, when the cover is off, and look part of the vehicle.

The cover, because of its lack of metal parts in the cover, can be used as a cover for high loads, where it is not attached to the rails and if it was shaking, it would not damage the paint. Holes can be drilled in the plastic strip to tie to, for a high load cover and these will not affect the waterproofness of the cover.

The rails can also be used as load tie downs, by using shock cord ties, with hooks, which can hook into the gap between the rails and truck bed.

As the flexible cover material can change its stiffness with the temperature, it is important the cover can be fitted easily, in different temperatures. This invention facilitates this, by using the leverage of standing the plastic strip vertical, against the rail, and folding down horizontal. This is easily achieved in all temperatures, whereas with a snap attachment, one half has to be pulled to the other half to join flexible materials which often vary with temperature and can be difficult to attach in cold and wet weather.

BRIEF DESCRIPTION OF THE DRAWINGS

FIG. 1 Perspective view of pickup truck with cover installed, also shows direction of all other drawings.

FIG. 2 shows open truck bed with L shaped rails installed to the top inside edge of the bed.

FIG. 3 closer view of top inside edge of truck bed with rail attached with screws to truck bed.

FIG. 4 shows rail prior to installation to truck bed.

FIG. 5 cross section of truck bed, with rails and cover installed. Truck bed 9. Plastic strip 11. Rail 7. Cover 10.

FIG. 6 top view of truck bed showing cover fitted to rails.

DESCRIPTION OF PREFERRED EMBODIMENTS

The essence of this invention is the use of extruded plastic strip (11), measuring one to two inches wide, and an eighth of an inch thick, depending on it's application; to hold a flexible cover to aluminum rails (7) fitted to a square storage area such as a bed of a pickup truck, boat cockpit or swimming pool. Because the plastic strip is sewn into the edge of the cover, with enough of a seam, to offer strength, and this method of attachment needs the cover to fit the open storage space excactly, each application needs to be made exactly.

The exact sizing for each application allows the plastic strip in the cover to fold into the gap between the rails and the truck bed. And to be retained there, by the downward forces on the cover and the contraction of the cover, once it has been stretched to allow this to happen.

Each rail has to be sized to the storage space to support the cover continuously, while allowing the cover to turn the corners. It is the use of leverage, by standing the plastic strip vertical against the rail and folding horizontal, which is the originality of this invention and accounts for it's workability under the varying conditions of the environment in which it survives.

Easy access to the enclosed space of a pickup truck bed, when covered by a flexible material cover, without having to remove the cover, may be provided by a zip-out access panel. The zip-out access panel facilitates a separate opening within the cover itself for one-handed opening by a means of a U-shaped panel behind the cab of the truck. The U-shaped section, preferably measuring 50 inches across the width of the vehicle and 25 inches down the length, can be opened from either side by means of two sliders on a continuous interlocking teeth closing device, commonly known as a zipper. The U-shaped hatch may be cut in the flexible cover, preferably to the above specifications. A one inch vinyl binding is preferably applied to each edge of the opening and has the purpose of covering the zipper for weather and water protection. Then the zipper may be sewn into the opening under the binding to close the opening.

I claim:

1. A cover assembly for a vehicle cargo bed, the cargo bed having four sidewalls defining a quadrilateral opening, comprising:
    a collapsible cover defining a substantially quadrilateral periphery, the cover being of sufficient size to enclose the quadrilateral opening with the cover periphery extending slightly therebeyond, the cover having a flexible, relatively flat plastic strip hingedly attached to and extending substantially continuously around the cover periphery, the strip having a predetermined thickness;
a plurality of L-shaped rigid rails; and
means for fixedly attaching the rails to an inside of the four sidewalls with each of the sidewalls having at least one rail attached at the inside thereof, the attached rails each forming an outwardly facing, rigid gap above and adjacent to the quadrilateral opening of sufficient size for the strip to be inserted and removably held therein when the cover stretchably encloses the quadrilateral opening.

2. The cover assembly as in claim 1 further comprising:
a selectively removable hatch disposed in the cover of sufficient construction to permit access into the cargo bed without removing the strip from the gap.

* * * * *